(12) United States Patent
Michalski et al.

(10) Patent No.: US 7,412,337 B2
(45) Date of Patent: Aug. 12, 2008

(54) METHOD FOR DETERMINING FILL LEVEL ON THE BASIS OF TRAVEL TIME OF A HIGH-FREQUENCY MEASURING SIGNAL

(75) Inventors: Bernhard Michalski, Maulburg (DE); Dominik Buser, Mohlin (CH); Stefan Scherr, Kandern (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 60 days.

(21) Appl. No.: 11/580,109

(22) Filed: Oct. 13, 2006

(65) Prior Publication Data

US 2007/0103333 A1     May 10, 2007

Related U.S. Application Data

(60) Provisional application No. 60/725,638, filed on Oct. 13, 2005.

(30) Foreign Application Priority Data

Oct. 13, 2005   (DE) .................... 10 2005 049500

(51) Int. Cl.
G01F 17/00     (2006.01)
G01F 23/00     (2006.01)
G06F 19/00     (2006.01)

(52) U.S. Cl. .......................... 702/55; 702/79

(58) Field of Classification Search .............. 702/55, 702/69, 74, 75, 79; 73/290 V, 1.73
See application file for complete search history.

(56) References Cited

U.S. PATENT DOCUMENTS 4,221,004 A * 9/1980 Combs et al. ............... 367/114
6,679,115 B2 * 1/2004 Heidecke ................... 73/290 V

FOREIGN PATENT DOCUMENTS

DE     298 15 069 U1     2/1999
DE     101 06 681 A1     1/2003

* cited by examiner

*Primary Examiner*—Bryan Bui
(74) *Attorney, Agent, or Firm*—Bacon & Thomas, PLLC (57) ABSTRACT

A method for determining the fill level (l) on the basis of the travel time (t) of a high-frequency measuring signal ($S_{HF}$), which is transformed into a lower frequency, intermediate-frequency measuring signal ($S_{ZF}$), wherein the transformation factor ($K_T$) is obtained from a difference frequency ($f_{Sweep}$) between a pulse repetition frequency ($f_{PRF}$) and a sampling frequency ($f_{sample}$) The pulse repetition frequency ($f_{PRF}$) or the sampling frequency ($f_{sample}$) is altered on the basis of a control with a control variable (c_var) through an appropriate control algorithm, such that a desired value ($f_{Sweep\_setpoint}$) of the difference frequency is controlled to; wherein a gradient (grad) of at least two values is determined, and on the basis of the gradient (grad) and the difference frequency ($f_{Sweep}$), or difference time ($t_{Sweep}$), in the case of a set control variable (c_var), an operating point (OP) of the control is determined, and the control algorithm is adjusted accordingly thereto.

11 Claims, 2 Drawing Sheets

METHOD FOR DETERMINING FILL LEVEL ON THE BASIS OF TRAVEL TIME OF A HIGH-FREQUENCY MEASURING SIGNAL

FIELD OF THE INVENTION

The present invention relates to a method for determining fill level based on the travel time of a high-frequency measuring signal, which, by means of a transformation method having a certain transformation factor, is transformed into a lower frequency, intermediate-frequency signal.

BACKGROUND OF THE INVENTION

Such methods for determining and monitoring fill level in a container are often used in measuring devices in the fields of automation- and process control technology. For example, measuring devices under the names Micropilot or Levelflex are produced and sold by the assignee. These measuring devices function according to the travel-time measurement method, and serve for determining and/or monitoring a fill level of a medium in a container. In the guided microwave method, or the TDR (Time Domain Reflection) method, a high-frequency pulse is emitted along a Sommerfeld or Goubau wave guide, or along a coaxial wave guide. This pulse, upon meeting a discontinuity in the DC-value (dielectric constant) of the medium surrounding the wave guide, is partially reflected back. In the freely-radiating, travel time measuring method, for example, microwaves are emitted via an antenna into a free space, and the echo waves reflected on the surface of the medium are then received back by the antenna following the separation-dependent, travel time of the signal. On the basis of the time lapse between the transmission of the high-frequency pulse and the reception of the reflected echo signals, the separation from the measuring device to the surface of the medium can be obtained. Taking into account the geometry of the interior of the container, the fill level is then determined as a relative or absolute parameter.

The travel time measuring method can be divided essentially into two categories: The first is based on a time measurement and requires a pulse sequence-modulated signal for the distance covered; a second widely-used evaluation method is to determine the sweep difference frequency between the emitted, continuous, high-frequency signal and the reflected, received high-frequency signal (FMCW—frequency modulated continuous wave). In general, the following explanations are not limited to a specific evaluation method.

A general problem in the case of all travel time measuring methods using high-frequency measuring signals in the GHz (Gigahertz) region is that, for the evaluation of high-frequency measuring signals, high-frequency components, which are designed for such high-frequency ranges, must be used. These high-frequency components have the disadvantage that they are complex to produce and very expensive to purchase. One possibility for evaluating the high-frequency measuring signals using inexpensive low-frequency components is to map the high-frequency signals into the low-frequency range by means of a sequential sampling. The method for the sequential sampling of high-frequency measuring signals represents a possibility for transformation into the low-frequency range, wherein, in this method, a time-expanded, intermediate-frequency signal is generated from a multiplicity of quasi high-frequency, periodically-sampled, measurement signals. This additional processing step is carried out because there are no suitable, cost-effective data-processing units, e.g. DSPs (Digital Signal Processors) which can reliably process high-frequency measuring signals.

An approach for generating a time-expanded, intermediate-frequency signal is the mixing principle in which two oscillators produce two oscillations with slightly different frequencies. Through the slight "detuning" of the frequencies of the two oscillations, a phase shift results, which increases linearly with each measuring period. This phase shift corresponds to a linearly-increasing time delay.

The mixing principle is illustrated for example in DE 31 07 444 A1 by means of a high-resolution, pulse radar method. A generator produces first microwave pulses and radiates them via an antenna, at a predetermined transmission repetition frequency, in the direction of the surface of the filling substance. A further generator produces reference microwave pulses, which correspond to the first microwave pulses, but differ slightly from these as regards the repetition frequency. The echo signal and the reference signal are mixed, for example, by a frequency converter, or mixer, whereby an intermediate frequency signal is generated. The intermediate frequency signal has the same behavior as the echo signal, but is, however, stretched relative thereto by a transformation factor, which is equal to a quotient of the pulse repetition frequency and the difference frequency between the pulse repetition frequency of the first microwave pulses and the sampling frequency of the reference microwave pulses.

In the case of a pulse repetition frequency of several megahertz, a difference frequency of a few hertz, and a microwave frequency of several gigahertz, the frequency of the intermediate frequency signal lies well below 200 kHz. The advantage of the transformation to the intermediate frequency is that relatively slow, and thus inexpensive electronic components for registering and/or evaluating signals can be used.

Referenced in this connection is also German Utility Model DE 29815069 U1, which describes this known transformation technology in the case of a TDR-fill level measuring device. This sampling circuit has two oscillators, at least one of which has a variable frequency, with one oscillator driving the transmitting generator, and the other driving the sampling pulse generator. A frequency mixer forms the difference of the two frequencies, which is used for adjusting, or controlling, the transformation factor, which is to be as constant as possible, to a desired value via a feedback branch.

A disadvantage of regulating the difference frequency to a desired value according the state of the art is that such a control takes a very long time, and, under certain conditions, results in regulating to an incorrect desired value of the difference frequency.

SUMMARY OF THE INVENTION

An object of the invention is to assure, by a control algorithm, a fast, safe, and exact control of the difference frequency of the signals of two oscillators to a predetermined, desired value of the difference frequency.

This object is achieved by the invention through a method for determining fill level on the basis of the travel time of a high-frequency measurement signal, which is transformed into a lower-frequency, intermediate-frequency signal by means of a transformation process having a certain transformation factor; wherein the transformation factor is produced and determined from a difference frequency, or a difference time, of a difference signal formed from a pulse repetition signal having a pulse repetition frequency and a sampling signal having a sampling frequency; wherein the pulse repetition frequency and/or the sampling frequency are/is altered on the basis of a control having a control variable on the basis of a corresponding control algorithm, such that the difference frequency, or difference time, is controlled to a desired value; wherein, between at least two values of the difference frequency, or between at least two values of the difference time, as a function of the control variable, a gradient is determined; and wherein, on the basis of the gradient, and the difference frequency or the difference time, at set control variable, an operating point of the control is determined, and the control algorithm is adjusted accordingly thereto.

By establishing the gradient, it is possible to determine the position of the operating point of the control in the safe control region and in the critical control region, taking into consideration the measured value of the difference frequency, or difference time, at the operating point. If the operating point lies in a critical control region, then the control variable is set in a defined state with an operating point in the safe control region, and from there, the control algorithm is started and carried out. If, after establishing the gradient, the operating point has been located in the safe control region, then the control algorithm alters the control variable in the control/evaluation unit such that the present operating point approaches the desired value of the operating point.

In an especially preferred form of embodiment of the invention, it is provided that the polarization, or sign, of the difference frequency of the difference signal, or the difference time, is obtained by means of the gradient. By determining the polarization or sign of the difference frequency, or difference time, it is possible to detect whether the first oscillator, or sampling clock oscillator, is clocked slower or faster than the second oscillator, or transmission clock oscillator. This polarization-detection is necessary because, through the construction of the control circuit, only the difference frequency between the sampling frequency and the pulse repetition frequency is obtained, regardless of which oscillator is clocked faster or slower for the production of the sampling frequency or pulse repetition frequency. In normal cases, the sampling clock oscillator with the sampling frequency has a somewhat slower clock cycle than the transmission clock oscillator with the pulse repetition frequency. The case in which the sampling clock oscillator has a faster clock cycle, that is, a higher frequency than the transmission clock oscillator, is not desired in the transformation method; as a result, a control of the difference frequency to a desired value in this critical control region is prevented.

A practical embodiment of the invention is one in which a control characteristic curve of the difference signal is recorded by determining and storing the difference frequency, or difference time, as a function of the changing control variable. The control characteristic curve can be recorded by cycling through the entire range of the control variable one time, and identifying and storing the corresponding values of the difference frequency, or difference time. These data are illustrated in a diagram, wherein recognizable at a turning point are a pole point for the difference time, or a zero point for the difference frequency.

On the basis of this pole point, or zero point, as the case may be, at least two identical values of the difference frequency, or difference time, respectively, can be obtained in the case of two different control variables. One of these values, or operating points, lies in a critical control region in which the sampling clock oscillator has a faster clock cycle than the transmission clock oscillator. The other operating point lies in a safe control region, in which the sampling clock oscillator has a slower clock cycle than the transmission clock oscillator. On the basis of the gradient and the diagram, a conclusion concerning the control process can be drawn. In the diagram, an appropriate desired value of the operating point is obtained, toward which the control is directed using the control algorithm. In addition, the control behavior of the control loop can be monitored, since this can change based on external influences or aging phenomena. Thus, with regard to the preventative maintenance of the apparatus, the control loop is monitored for errors and indications of deterioration.

In accordance with an advantageous form of embodiment of the method of the invention, it is provided that the control algorithm restores the operating point into a defined, safe control region by resetting the control variable to a minimum value when the operating point is identified in a critical control region of the control. The operating point is transferred into a safe control region by regulating the control variable, e.g. a control voltage, back to a defined minimum value which lies in the safe control region. Starting from this minimum value, in the control/evaluation unit, the control algorithm alters the control variable in steps, such that the present operating point steadily approaches the desired value of the operating point.

A very advantageous variant of the method of the invention is one in which the control algorithm regulates the operating point to the desired value of the operating point by constantly altering the control variable when the operating point is determined to be in a defined, safe control region of the control. The control algorithm regulates the present difference frequency to the desired value of the difference frequency, or the present difference time to the desired value of the difference time, by steadily decreasing or increasing the control variable, e.g. a control voltage, depending on whether the present operating point is located above or below the desired value of the operating point.

In accordance with an advantageous form of embodiment of the method of the invention, it is provided that a disturbance is recognized by the control algorithm if the operating point is determined to be permanently in the disturbance range above a maximum limit value of the difference frequency, or below a minimum limit value of the difference time. Since a difference time below this minimum limit value, or a difference frequency above this maximum limit value, cannot occur in the control, a disturbance of the hardware must be present. This identification of a disturbance of the control loop can be represented as a report on a display of the fill level measuring device, or can be transferred to a control station or to other field devices via a field bus. Furthermore, it is possible that, through the identification of a disturbance of the control loop, the control/evaluation unit, or the whole measuring device, will re-initialize, and thus bring the control into a defined starting condition.

In an advantageous form of embodiment of the method of the invention, it is provided that, for a defined limit value of the control deviation of the difference frequency from the desired value of the difference frequency, or of the difference time from the desired value of the difference time, an error counter is incremented in the control algorithm, when this limit value is exceeded, or is decremented, when this limit value is complied with. If the measured values of the difference time or difference frequency deviate a certain amount from the predetermined desired values of the difference time, or difference frequency, e.g. ±1 μs (microsecond) or 1 mHz (millihertz), an error counter is activated. The error counter is increased by "one" if the present measured value lies outside of the fixed limits, and is decreased by "one" if the present measured value complies with the fixed limits.

In accordance with an advantageous form of embodiment of the method of the invention, it is provided that a maximum count value of the error counter is set, at which the error counter is cleared, the control algorithm is interrupted, and the operating point is transferred into a defined, safer control region of the control characteristic curve, by setting the control variable back to a minimum value. If the error counter produces a so-called overflow, when the present count value exceeds the fixed maximum count value by 100, for example, a control into a safe control region is re-started by setting the control variable back to a minimum value. In such a case, the maximum count value of the error counter determines the error tolerance of the control system, or control loop.

An advantageous form of embodiment of the method of the invention is one in which a pulse-width modulated control signal is used by the control algorithm as control variable to a first tolerance value in the form of a large control deviation of the difference frequency from the desired value of the difference frequency or of the difference time from the desired value of the difference time. The first tolerance value determines, in which region of the deviations of the present difference time, or of the present difference frequency, from their respective desired values, a pulse-width-modulated control signal is used for regulating and actuating the frequency control unit. The pulse-width-modulated control signal is suitable for large deviations of the present difference time, or of the present difference frequency, from their respective desired values, since large changes in the control variable, or control voltage, can be achieved, whereas a precise control of the difference frequency, or difference time, to the desired value in the case of small deviations is only difficultly possible. This first tolerance value of a large control deviation lies, for example, at 5 ms (milliseconds).

A supplementing, advantageous variant of the method of the invention is one in which, as the control variable at a second tolerance value of a medium control deviation of the difference frequency from the desired value of the difference frequency, or of the difference time from the desired value of the difference time, a pulse-sequence-modulated control signal is produced by the control algorithm. After a second tolerance value, for the previously-described reasons, namely that a pulse-width-modulated control signal is not suitable for precise control of the actual value to the desired value of the difference time, or difference frequency, a pulse-sequence-modulated control signal is used. The control/evaluation unit, or microcontroller, as a function of its operating frequency, produces short pulses, which result in the pulse-sequence-modulated control signal. The microcontroller produces maximally short pulses, which, as a pulse sequence of the required control variable, actuates the frequency control unit. This second tolerance value of a medium control deviation lies, for example, at 1 μs (microsecond).

Furthermore, it is provided that, at a third tolerance value of a small or tendential control deviation of the difference frequency from the desired value of the difference frequency, or of the difference time from the desired value of the difference time, it is not immediately counter-controlled with an appropriate control variable; rather, a tendency of the control deviations is determined, and a tendential control signal is produced, which is joined to the subsequent pulse-sequence-modulated control signals, or on the pulse-width-modulated control signals. If the present control deviation of the difference time lies, for example, in the range of a few μs (microseconds), and/or this corresponds to a tendential control deviation, then it is not immediately corrected; rather, these most minimal changes are taken into consideration in the later pulse-sequence-modulated or pulse-width-modulated control signals. Since such small control deviations below the third tolerance value can be only very difficultly corrected by a subsequent readjusting or updating of the control variable, the mathematical integration of these tendential control deviations into the large and medium control deviations affords a possibility to construct the control such that it is more precise and more stable. As a result, an overshooting and a subsequent settling of the control can be avoided.

BRIEF DESCRIPTION OF THE DRAWINGS

The invention will now be described in greater detail on the basis of the drawings, the figures of which show as follows (for simplification in the drawings, identical parts have been provided with the same reference characters).

DESCRIPTION OF THE PREFERRED EMBODIMENTS

Figure 1:
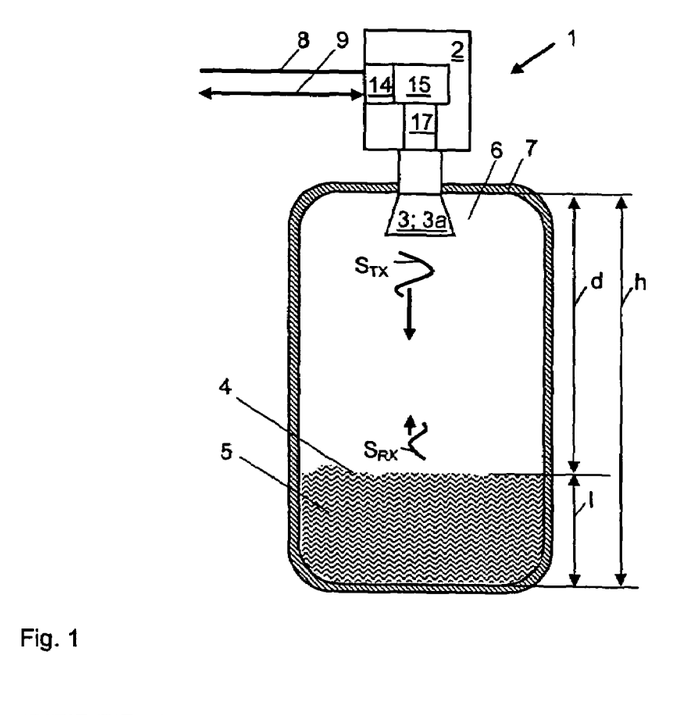
FIG. 1 an example of an embodiment of an apparatus for determining fill level in a container.
Figure 2:
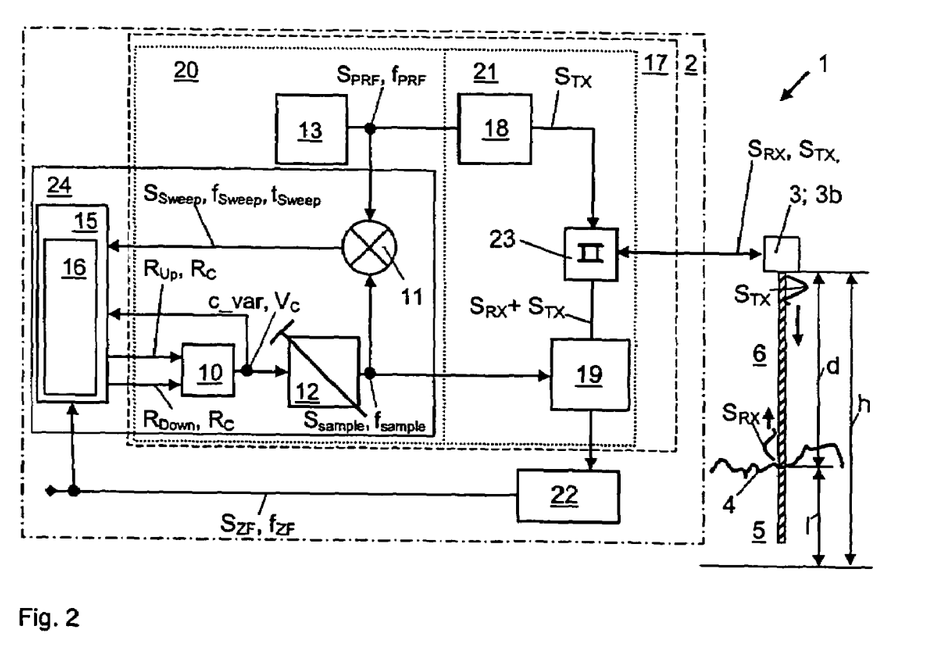
FIG. 2 an example of an embodiment of the control loop of the apparatus for producing the intermediate frequency, with the transmitting/receiving unit and control/evaluation unit.

FIG. 1 shows an example of an embodiment of the apparatus 1 of the invention for determining the distance d, or the fill level l, on the basis of the travel time t of high-frequency measuring signals $S_{HF}$. For this purpose, apparatus 1 includes primarily a measuring unit 3 connected with the measuring transmitter 2, by means of which the high-frequency measuring signal $S_{HF}$, or the transmission signal $S_{TX}$, is coupled, and emitted, into a process space 6 in the container 7 bounding the fill substance 5. The measuring unit 3 is directed into the process space 6 of the container 7 through an opening, e.g. a nozzle. The measuring unit 3, or the transducer element, as shown in FIG. 1, can be configured as an antenna 3a, and especially as a horn antenna, a rod antenna, a parabolic antenna, or also a planar antenna, which freely radiates the transmission signal $S_{TX}$, into the process space 6 of the container 7. Instead of the antenna 3a freely radiating into the process space 6, a surface wave guide 3b in the apparatus for fill level measurement, as shown in FIG. 2, can also be used as the measuring unit 3. This wave guide directs the high-frequency measuring signal $S_{HF}$ along its surface on the basis of the skin effect.

In the measuring transmitter 2 of the apparatus 1, the transmission signals $S_{TX}$ are produced in a transmitting/receiving unit 17, which emits and receives signals, and are transferred to the sending measuring unit 2. Sent transmission signals $S_{TX}$, which, for example, have been reflected on the surface of the fill substance 5, are received by the measuring unit 2 and directed back to the transmitting/receiving unit 17, in which the received reflection signals $S_{RX}$ are processed. The high-frequency measuring signals $S_{HF}$, composed of transmission signals $S_{TX}$ and reflection signals $S_{RX}$, are, for example, via a sampling process, or a sequential sampling with two slightly offset, high-frequency pulse sequences, transformed in the transmitting/receiving unit 17 into a time-expanded, low-frequency, intermediate frequency signal $S_{ZF}$. The intermediate-frequency signal $S_{ZF}$, mixed-down in this manner, can subsequently be evaluated in the low-frequency area of the control/evaluation unit 15, and the travel time t, or travel path x, of the transmitted high frequency measuring signals $S_{HF}$ can be determined.

Accordingly, in the case of the guided microwave method, or the TDR-measuring method (time domain reflectometry), for example, a transmission signal $S_{TX}$ is sent out along a Sommerfeld or Goubau surface wave guide 3b, or a coaxial wave guide, which, in the case of a discontinuity of the DC-value (dielectric constant) of the fill substance 5 surrounding the surface wave guide 3b, is reflected back. As a result of the impedance jumps caused by the fill substance 5 within the process space 6 of the container 7, especially at the interface 4 between the free space and fill substance 5 in the container 7, the transmission signal $S_{TX}$ is at least partially reflected back. On the basis of this, a corresponding, mostly weaker reflection signal $S_{RX}$ travels back in the opposing direction along the surface wave guide 3b to the transmitting/receiving unit 17.

The high-frequency measuring signals $S_{HF}$ which are freely radiated from the antenna 3a, and those which are directed along the lossless surface wave guide 3b, spread out in the open process space 6 of the container 7 in atmospheres of air or protective gas, approximately at the speed of light $c_0$. These transmission signals $S_{TX}$ are partially or fully reflected back on surfaces 4 located in the radiation cone of the antenna 3a, or near the surface wave guide 3b, of media, for example the fill substance 5, having a higher DC-value than that of the air or the protective gas. Using the measured travel time t between the sent transmission signal $S_{TX}$ and the reflected reflection signal $S_{RX}$, the length traveled x, or distance d, is determined through a conversion via the formula for calculating wave velocity. This length difference, or distance d, corresponds to the height h of the container 7 minus the fill level l of the fill substance 5 in the container 7. Since the height h of the container 7, and/or the in-coupling position of the transmission signal $S_{TX}$, is known, the fill level 1, and, when necessary, even the volume can be determined, and/or when the density of the fill substance 5 is known, the mass of fill good 5 in the container can also be determined.

The communication/supply unit 14 controls communication with, for example, a remote control station or another measuring device, or field device, via a field bus 9, and receives and sends the measured values, e.g. the fill level l, or configuration data of the apparatus 1. Field bus 9 functions according to the usual communication standards, such as e.g. Foundation Fieldbus or Profibus-PA, and is, for example, embodied using the two-wire technology common in the field of process measurement technology. The supply of energy, or power, to the apparatus 1 can, in addition to the energy, or power, supply of the apparatus 1 on field bus 9 using the two-wire standard, be accomplished by means of a separate power supply line 8. The communication/supply unit 14 can be embodied as an integral component of the control/evaluation unit 15.

FIG. 2 shows, in a block diagram, an example of an embodiment of the apparatus 1. Depicted is the measurement transmitter 2 of the apparatus for producing the intermediate frequency $S_{ZF}$, including a transmitting/receiving unit 17 and a control/evaluation unit 15. The transmitting/receiving unit 17 can be divided into an HF-circuit section 21, with a transmission pulse generator 18, sampling circuit 19, and transmitting/receiving duplexer 23, in which, basically, HF-signals are generated and processed, and an LF-circuit section 20, with a transmission clock oscillator 13, a sampling clock oscillator 12, and a frequency converter 11, in which, basically, LF-signals are generated and processed. The individual circuit elements in the HF-circuit section 21 are constructed, based on experience, with analog circuit technology, i.e., analog measurement signals are generated and processed.

On the other hand, the individual circuit elements in the LF-circuit section 20 can be constructed using digital circuit technology and/or analog circuit technology. Considering the rapid advancements being made in digital signal processing, it is also conceivable that the HF-circuit section 21 can be embodied with digital circuit elements. A widest variety of the individual circuit elements in digital and analog circuit technology, not explicitly explained here, is also possible. Therefore, the following description of the form of embodiment in FIG. 2 is to be considered as only one example out of many possible forms of embodiments. To reduce the illustration to only the basic elements, the communication/supply unit 14 is not detailed in FIG. 2.

In the case of travel time measurement of pulsed, high-frequency measuring signals $S_{HF}$, the transmitting/receiving unit 17, coupled to the measuring unit 3, is used to generate and process mutually coherent wave packets of predetermined pulse form and pulse width, so-called "bursts" or short wave packets. The pulse form of an individual "burst" or short wave packet normally corresponds to needle-shaped, or sinusoidal, half-wave pulses of a predetermined pulse width. However, if necessary, other suitable pulse forms for these bursts can be used. For this purpose, the transmitting/receiving unit 17 includes a transmission pulse generator 18, triggered by the transmission clock oscillator 13, for producing a first burst sequence, which serves as a transmission signal $S_{TX}$.

The pulses of the transmission signals $S_{TX}$ are carried with a high frequency $f_{HF}$ of the transmission pulse generator 18, which lies approximately in the range between 0.5 and 78 GHz, and, moreover, are triggered with a pulse repetition frequency $f_{PRF}$, or firing rate, which is set to a frequency range of a few Megahertz, especially a frequency range of 1 MHz to 10 MHz. This pulse repetition frequency $f_{PRF}$ for actuating the transmission pulse generator 18 is produced by a transmission clock oscillator 13. However, if necessary, the high frequency $f_{HF}$ and/or pulse repetition frequency $f_{PRF}$ can, in each case, also lie outside the given frequency ranges.

By means of a transmitting/receiving duplexer 23 of the transmitting/receiving unit 17, especially by means of a directional coupler or a hybrid coupler, the transmission signal $S_{TX}$, lying on the signal output of the transmission pulse generator 18, is coupled into a measuring unit 3, e.g. antenna 3a or surface wave guide 3b, which is connected to a first signal output of the transmitting/receiving duplexer 23. At practically the same time, in addition, the transmission signal $S_{TX}$ lies on the second signal output of the transmitting/receiving duplexer 23. The reflected measurement signals $S_{RX}$, generated in the process volume 6 of container 5 in the manner described above, are, as previously mentioned, received back by the apparatus 1 by means of the measuring unit 3, and out-coupled at the second signal output of the transmitting/receiving duplexer 23.

In accordance with this, a total measuring signal $S_{TX}+S_{RX}$, formed by the transmission signal $S_{TX}$ and the reflected measuring signal $S_{RX}$, can be tapped at the second signal output of the transmitting/receiving duplexer 23.

A direct evaluation of the high-frequency total measuring signal $S_{TX}+S_{RX}$, lying on the second signal output of the sending/receiving duplexer 23, especially a direct measuring of the travel time t, is practically not possible, or possible only with great technical complexity, e.g. by using high-frequency electronic components. For this reason, the transmitting/receiving unit 2 also includes a sampling circuit 19, which expands the high-frequency-carried, total measuring signal $S_{TX}+S_{RX}$ in time, such that the high frequency $f_{HF}$ and the pulse repetition frequency $f_{PRF}$ are transformed into a lower frequency range of a few hundred kilohertz.

For the time expansion of the total measuring signal $S_{TX}+S_{RX}$, this is fed to a first signal input of the sampling circuit 19, connected with the second signal output of the sending/receiving duplexer 23. Simultaneously with the total measuring signal $S_{TX}+S_{RX}$, a sampling signal $S_{sample}$ of the sampling oscillator 12 is applied at a second signal input of the sampling circuit 19. A sampling frequency $f_{sample}$, or clock rate, with which the sampling signal $S_{sample}$ is clocked, is normally set somewhat lower than the pulse repetition frequency $f_{PRF}$ of the transmission signal $S_{TX}$. By means of the sampling circuit 19, the total measuring signal $S_{TX}+S_{RX}$ is mapped onto an intermediate frequency signal $S_{ZF}$, which is expanded in time by a transformation factor $K_T$ relative to the total measuring signal $S_{TX}+S_{RX}$. On the basis of the frequency offset between the pulse repetition frequency $f_{PRF}$ and the sampling frequency $f_{sample}$, this sampling circuit 19 samples the total measuring signal $S_{TX}+S_{RX}$ in each period at a different phase position, whereby a time-expanded intermediate frequency signal $S_{FX}$ with the previously-described transformation factor $K_T$ is produced. The sampling circuit 19 is embodied, for example, as an HF-frequency converter, or HF-mixer, with a sampling pulse generator, which has the same phasing and frequency of the burst sequence as the transmission pulse generator 18, or it is embodied as a faster sampling switch. As the sampling switch, for example, HF-diodes or fast transistors can be used.

The transformation factor $K_T$, with which the total measuring signal $S_{TX}+S_{RX}$ is transformed into a lower frequency, intermediate-frequency signal $S_{ZF}$, corresponds to a quotient of the pulse repetition frequency $f_{PRF}$ of the transmission signal $S_{TX}$ divided by a difference of the pulse repetition frequency $f_{PRF}$ of the transmission signal $S_{TX}$ and the sampling frequency $f_{sample}$ of the sampling signal $S_{sample}$:

$$K_T = \frac{f_{PRF}}{f_{Diff}} = \frac{f_{PRF}}{f_{PRF} - f_{sample}} \triangleq \frac{f_{HF}}{f_{ZF}} \quad \text{(Eq. 1)}$$

An intermediate frequency $f_{ZF}$ of the intermediate-frequency signal $S_{ZF}$ produced in this way normally lies, in the case of such types of apparatus 1 for determining fill level 1, in a frequency range of 50 to 200 kHz; however, if necessary, the frequency range can also be selected such that it is higher or lower. From experience, in the measuring devices of the assignee, the intermediate frequency $f_{ZF}$ is set at circa 160 kHz. The dependency of the intermediate frequency $f_{ZF}$ on the ratio of the sampling frequency $f_{sample}$ and the pulse repetition frequency $f_{PRF}$, as shown in the second equation (Eq. 2), can be derived from the first equation (Eq. 1):

$$f_{ZF} = f_{HF} \cdot \left(1 - \frac{f_{sample}}{f_{PRF}}\right) \quad \text{(Eq. 2)}$$

If necessary, the intermediate frequency signal $f_{ZF}$, which is expanded in time by a transformation factor $K_T$ relative to the total measuring signal $S_{TX}+S_{RX}$, is suitably amplified and filtered, through a filter/amplifier unit 22, as a filtered intermediate frequency signal $S_{gefZF}$, before it is evaluated as an echo curve or envelope curve in the control/evaluation unit 15, or in additional evaluating circuits.

This difference frequency $f_{Sweep}$ is determined for two reasons: First, through this control loop 24, the instantaneous actuation and triggering of the sampling clock oscillator 12, and possibly also of the transmission clock oscillator 13, is checked by the control/evaluation unit 15; and, second, in the control/evaluation unit 15, a transformation factor $K_T$ is obtained from the quotient of the known or measured pulse repetition frequency $f_{PRF}$ and the difference frequency $f_{Sweep}$. Furthermore, in the control/evaluation unit 15, the travel time t of the measuring signals, as well as the fill level l, can also already be obtained through evaluating the echo signal of the filtered intermediate frequency signal $S_{ZF}$, and through knowledge of the transformation factor $K_T$.

In this embodiment, a difference frequency $f_{Sweep}$ between the sampling clock oscillator 12 and the transmission clock oscillator 13 is obtained in the LF-circuit section 20 of the transmitting/receiving unit 17 through the sequential sampling of the pulse repetition frequency $f_{PRF}$ with the sampling frequency $f_{sample}$ by means of a frequency converter 11. This difference frequency $f_{Sweep}$, or its difference time $t_{Sweep}$, is processed and measured in the control/evaluation unit 15. The difference time $t_{Sweep}$ corresponds to the reciprocal of the difference frequency $f_{Sweep}$.

By means of a feedback branch, the control/evaluation unit 15 re-actuates the actuatable sampling clock oscillator 12 according to the determined difference frequency $f_{Sweep}$, or the difference time $t_{Sweep}$. Through this structure, a control loop 24 is formed, which sets the difference frequency $f_{Sweep}$ largely at the desired value $f_{Sweepsetpoint}$ of the difference frequency, e.g. 21.73913 Hz. The actuation of the actuatable sampling clock oscillator 12 and, if necessary, the transmission clock oscillator 13, is accomplished by means of a frequency control unit 10, which, in the case of voltage-controlled oscillators (VCO), or oscillators with a parallel frequency-variable capacitance diode, emits a control voltage $V_C$ as a corresponding control variable c_var, or, in the case of digitally-controlled oscillators, e.g. NCO, a digital control value $V_{dig}$ is emitted as the control variable.

The frequency control unit 10 is adjusted by means of a so-called three-point control, through an upward control signal $R_{Up}$ and a downward control signal $R_{Down}$ of the control/evaluation unit 15, such that a control variable c_var lying on the outlet of the frequency control unit 10 correspondingly actuates the controllable sampling oscillator 12. The corresponding actuation of the sampling oscillator 12 occurs such that the defined desired value $f_{Sweepsetpoint}$ of the difference frequency between the pulse repetition frequency $f_{PRF}$ and the sampling frequency $f_{sample}$ is obtained. As the control variable c_var, for example, either the control voltage $V_C$ or a digital control value $V_{dig}$ can be used. The frequency control unit 10 is embodied, for example, as an RC-element, or a charge pump, which stabilizes the control voltage $V_C$, which controls the sampling frequency $f_{sample}$ of the sampling oscillator 12.

Using upward control signals $R_{Up}$, for example, the charge voltage of the charge pump is increased, while it is decreased using downward control signals $R_{Down}$. The manipulated control variable c_var, or control voltage $V_C$, is determined via a measuring line of the control/evaluation unit 15. This determination is necessary because normally only the difference frequency $f_{Sweep}$ is determined, and the effectively-generated control variable c_var, or control voltage $V_C$, is required for determining the gradient. A microcontroller 16 is, for example, integrated into the control/evaluation unit 15, for directing the control and executing the control algorithm.

Figure 3:
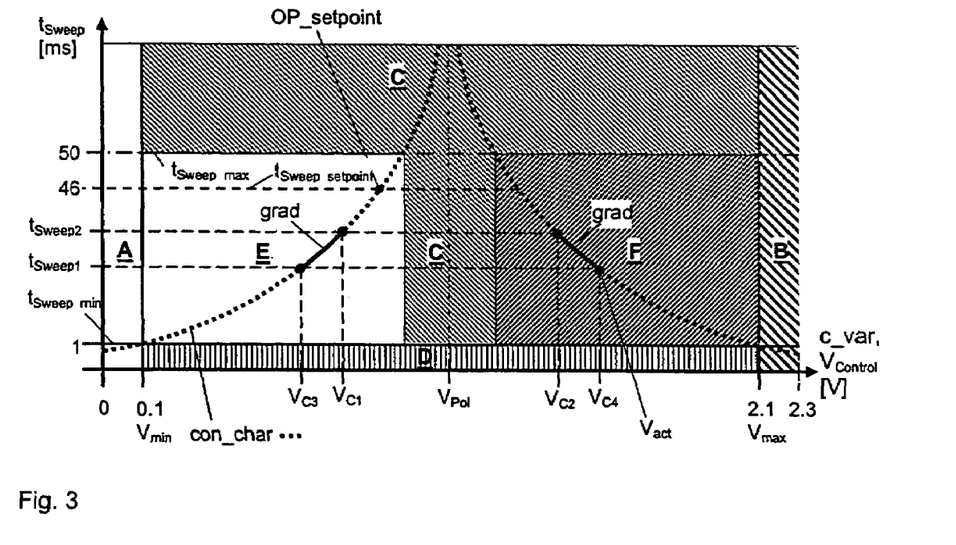
FIG. 3 an example of an embodiment of the control characteristic curve, showing the safe and critical control regions, and the disturbance region.

FIG. 3 illustrates an example of an embodiment of the control characteristic curve con_char of the difference time $t_{Sweep}$ showing the safe control region E and the critical control regions A, B, C, F, as well as the disturbance region D. On the ordinate of the coordinate system, the difference time $t_{Sweep}$ is shown, and on the abscissa of the coordinate system, as the control variable c_var, the control voltage $V_C$ is shown. In this example, an analog control voltage $V_C$ is indicated as the control variable c_var, although any other control variable c_var, such as, for example, a digital control value $V_{dig}$ or a mechanical control variable, can also be used.

The control characteristic curve con_char of the difference time $t_{Sweep}$ is illustrated completely in FIG. 3; however, it is also possible to use just individual properties, e.g. exceedance of a limit value and/or the gradient grad of the control characteristic curve con_char in the case of an actual control voltage $V_{act}$, obtained sectionally. The control characteristic curve con_char of the difference time $t_{Sweep}$, or the sectionally-determined properties, can be produced, for example, by constantly altering the control voltage $V_C$, or the control variable c_var, at the sampling oscillator 12 of FIG. 2, and by determining and storing corresponding values of the difference time $t_{Sweep}$, or the difference frequency $f_{Sweep}$, in the control/evaluation unit 15.

By obtaining these values, the position of the present operating point OP in the relevant control region A, B, C, D, E, F of the moment can be determined. If the operating point OP lies in a critical control region A, B, C, F, or a disturbance range D, then the control algorithm is interrupted, and a new control is started in a safe control region E. The initiation of the control in a safe control region E occurs, for example, in such a way that the control voltage $V_C$ is set to a minimum value $V_{min}$ of the control voltage, and is then steadily increased until a desired value OP_setpoint of the operating point, or a desired value $t_{Sweepsetpoint}$ of the difference time, is detected by the control/evaluation unit 15. An operating point cannot lie in the critical control regions A, B, since the control voltage $V_C$ can, according to the invention, be set only between a minimum value $V_{min}$ of the control voltage and a maximum value $V_{max}$ of the control voltage. These limiting values of the control voltage $V_C$ have been generated because this difference time $t_{Sweep}$ lies below a minimum limit value $t_{Sweepmin}$ of the difference time, e.g. under 1 ms (millisecond), and here operating points OP and gradients grad cannot be precisely determined.

The position of the desired value OP_setpoint of the operating point is selected such that a regulating of the difference time $t_{Sweep}$, or of the difference frequency $f_{Sweep}$, is easily possible through a corresponding control voltage $V_C$. If, on the other hand, the position of the $t_{Sweepsetpoint}$ of the difference time, or of the desired value $f_{Sweepsetpoint}$ of the difference frequency, is selected such that a slight change of the control voltage $V_C$ causes a great change of the difference time $t_{Sweep}$, or difference frequency $t_{Sweep}$, in that the operating point OP lies at a place on the control characteristic curve con_char, at which the gradient grad is very large, then an exact regulating to the desired value OP_setpoint of the operating point is only difficultly possible. On the basis of the gradient grad, it is determined with what degree of precision the control voltage $V_C$ must be altered, so that a certain change of the difference time $t_{Sweep}$, or of the difference frequency $f_{Sweep}$, can be attained. As a result, by determining a large gradient grad, the control voltage $V_C$, having a higher degree of precision, can be altered through a more exact, slower control algorithm, which makes only small changes to the voltage. If, on the other hand, the gradient grad is small, then the control voltage $V_C$ is altered in greater steps, because here a change to the difference time $t_{Sweep}$ does not have so strong an effect.

The control characteristic curve con_char, or the control characteristic of the difference time $t_{Sweep}$, has a pole point at a certain pole point control voltage $V_{Pol}$. At this pole point of the control characteristic curve con_char, the sampling frequency $f_{Sample}$ of the triggered sampling oscillator 12, and the pulse repetition frequency $f_{PRF}$ of the pulse repetition oscillator 13 are exactly the same. Because of the pole point of the control characteristic curve con_char of the difference time $t_{Sweep}$, it is possible to generate the same difference time $t_{Sweep}$ by means of a first control voltage $V_{C1}$ in the safe control region E, and by means of a second control voltage $V_{C2}$ in the critical control region F. The first control voltage $V_{C1}$ in the safe control region E here is designed to be correspondingly smaller than the pole point control voltage $V_{Pol}$, and the second control voltage $VC_2$ in the critical control region F is designed to be correspondingly greater than the pole point control voltage $V_{Pol}$. Above a maximum limit value ($t_{Sweepmax}$) of the difference time which lies above the desired value ($t_{Sweepsetpoint}$) of the difference time, the control algorithm is interrupted and the control of the difference time $t_{Sweep}$, or of the corresponding difference frequency $f_{Sweep}$, is re-started in the safe control region E.

By creating this maximum limit value $t_{Sweepmax}$ of the difference time, a rapid control of the difference time $t_{Sweep}$ to a desired value $t_{Sweep\_setpoint}$ of the difference time is first possible. The control in the critical control region C around the pole point, in which the difference time $t_{Sweep}$ reaches high, inexpedient values, and thereby causes long measuring and regulating times, is thus prevented. The contrary case, in which the control characteristic curve con_char, or the control characteristic of the difference frequency $f_{Sweep}$ (the reciprocal of the difference time $t_{Sweep}$, as it were) has a zero point with a turning point, is not explicitly explained, because of the analogy to the above explanations in the matter of FIG. 3.

Figure 4:
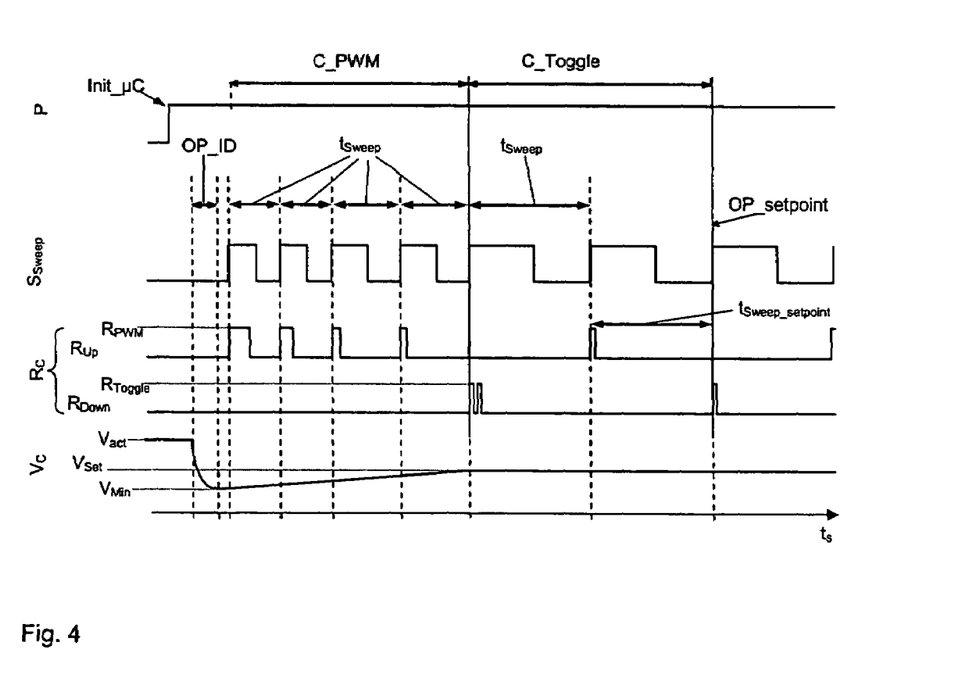
FIG. 4 an example of an embodiment of a schematic state diagram of the signals in the control loop illustrated in FIG. 2.

FIG. 4 shows a state diagram of the signals of the control loop 24 of FIG. 2. The state diagram is composed of the characteristic curves of five signals. All curves use the same time unit, or follow the same time scale $t_s$. The uppermost, first signal characteristic curve of the supply voltage P shows the time point Int_µC of the initialization of the microcontroller, or the starting time point of the voltage supply/feed of the microcontroller 16, or of the entire control/evaluation unit 15. The third and fourth signal characteristic curves provide the control signals $R_C$ for the upward-control $R_{Up}$, and for the downward-control $R_{Down}$, which show the signals for actuating a frequency control unit 10. The fifth signal characteristic curve represents the control voltage $V_C$, which, for example, is emitted by the frequency control unit 10, and which controls a voltage-controlled sampling clock oscillator 12. The feedback of the control loop 24, or the actuation of the sampling clock oscillator 12 by means of a frequency control unit 10, is achieved through the signal characteristic curves three, four, and five. The second signal characteristic curve of the difference signal $S_{Sweep}$ with the varying difference time $t_{Sweep}$ represents the control result of the control loop 24.

By switching the supply voltage P on, the microcontroller 16, or the control/evaluation unit 15, is initialized. In such case, it happens that, on the basis of past control process phases and the operating state, or transient behavior, of the electric components in this condition, a not-predefinable, actual control voltage $V_{act}$ lies on the sampling oscillator 12. For this reason, in the method of the invention, an operating point identification OP_ID is first carried out, which, in a first control step, determines a first difference time $t_{Sweep1}$ with the corresponding present control voltage $V_{act}$, or fourth control voltage $V_{C4}$.

Next, in a further control step, a second control voltage $V_{C2}$ is set, and a corresponding second difference time $t_{Sweep2}$ is determined. From the quotient of the difference of the first difference time $t_{sweep1}$ and second difference time $t_{Sweep2}$ to the difference of the corresponding control voltages $V_{C4}$, $V_{C2}$, a gradient grad, or slope, is defined. It is also suitable to carry out the production of a first control voltage $V_{C1}$ and a third control voltage $V_{C3}$, and to determine the corresponding difference times $t_{Sweep1}$, $t_{Sweep2}$. By determining the gradient grad, and whether the limit value $t_{Sweepsetpoint}$ of the difference frequency has been exceeded or not, it can be very quickly determined if the operating point OP of the control lies in a critical control region A, B, C, F, or in a safe control region E.

In FIG. 4, the example of FIG. 3 is used to show that the actual control voltage $V_{act}$ at the initialization of the microcontroller Int_μC, or at the initialization of the control/evaluation unit 15, has been localized in the critical control region F, and a gradient grad exists, which corresponds to this critical control region F. In this case, the control algorithm regulates the actual control voltage $V_{act}$ down to a minimum value $V_{min}$ of the control voltage, whereby a new regulating phase is started in the safe control region E. At the start of this regulating phase, there is a large deviation of the present difference time $t_{Sweep}$ from the desired value $t_{Sweep\_setpoint}$ of the difference time. For this reason, the present difference frequency $t_{Sweep}$ is altered through a pulse-width modulated control C_PWM, with pulse-width modulated control signals $R_{PWM}$, which are configured both as upward control signals $R_{Up}$, as well as downward control signals $R_{Down}$. Here, the upward control signals $R_{Up}$ and downward control signals $R_{Down}$ actuate the frequency control unit 10, which generates a corresponding control voltage $V_C$. An upward control signal $R_{Up}$, lying on the frequency control unit 10, causes an increase of the control voltage $V_C$ at the outlet of the frequency control unit 10. Conversely, a downward control signal $R_{Down}$, lying on the frequency control unit 10, causes a drop in the control voltage $V_C$.

If the deviation of the present difference time $t_{Sweep}$ from the desired value $t_{Sweepsetpoint}$ of the difference time is now only slight, then a change is made into a pulse-sequence modulated control, C_Toggle, with pulse-modulated control signals $R_{Toggle}$, in which the frequency control unit 10 is actuated only with short pulse sequences of very short pulses. The short pulses of the pulse-sequence-modulated control signals $R_{Toggle}$ make it possible then to perform slight modifications of the difference frequency $t_{Sweep}$, as required. Through this method, in which, in the case of slight deviations of the difference time $t_{Sweep}$ from the desired value $t_{Sweep—setpoint}$ of the difference time, a pulse sequence-modulated control signal $R_{Toggle}$ is used for a precise control, then only a slight transient behavior of the control occurs. If the difference time $t_{Sweep}$ is controlled to the desired value $t_{Sweep\_setpoint}$ of the difference time, then the desired value OP_setpoint of the operating point is set in the safe control region E. Through individual short pulses of the downward control signal $R_{Down}$ and the upward control signal $R_{Up}$, in the case of a difference time $t_{Sweep}$ controlled to the desired value $t_{Sweepsetpoint}$ of the difference time, a tendential control deviation can be counteracted. For this, the periods are interrupted, depending on the tendency of the control deviation, or one or more short pulses are omitted, as the case may be.

The invention claimed is:

1. A method for determining the fill level (l) in a container on the basis of the travel time (t) of a high frequency measuring signal ($S_{HF}$), which, by means of a transformation method with a certain transformation factor ($K_T$), is transformed into a lower frequency, intermediate-frequency signal ($S_{ZF}$), comprising the steps of:

producing the transformation factor ($K_T$) and obtained from a difference frequency ($f_{Sweep}$), or a difference time ($t_{Sweep}$), of a difference signal ($S_{Sweep}$) between a pulse repetition signal ($S_{PRF}$) having a pulse repetition frequency ($f_{PRF}$), and a sampling signal ($S_{Sample}$) having a sampling frequency ($f_{Sample}$);

altering the pulse repetition frequency ($f_{PRF}$), and/or the sampling frequency ($f_{Sample}$), on the basis of a control with control variable (c_var), through a corresponding control algorithm, such that the difference frequency ($f_{Sweep}$) is controlled to a desired value ($f_{Sweep\_setpoint}$) of the difference frequency, or the difference time ($t_{Sweep}$) is controlled to a desired value ($t_{Sweep\_setpoint}$) of the difference time;

determining a gradient (grad) between at least two values of the difference frequency ($f_{Sweep}$), or between at least two values of the difference time ($t_{Sweep}$), as a function of the control variable (c_var); and determining, on the basis of the gradient (grad) and the difference frequency ($f_{Sweep}$), or difference time ($t_{Sweep}$), at a set control variable (c_var), an operating point (OP) of the control, and the control algorithm is adjusted accordingly thereto.

2. The method as claimed in claim 1, wherein:

the polarization, or sign, of the difference frequency ($f_{Sweep}$), or difference time ($t_{Sweep}$), of the difference signal ($S_{Sweep}$) is obtained by means of the gradient (grad).

3. The method as claimed in claim 1, further comprising the step of:

recording a control characteristic curve (con_char) of the difference signal ($S_{Sweep}$) by determining and storing the difference frequency ($f_{Sweep}$), or the difference time ($t_{Sweep}$), as a function of the changing control variable.

4. The method as claimed in claim 1, further comprising the step of:

restoring the operating point (OP) by the control algorithm to a defined, safe control region (E) by setting the control variable (c_var) back to a minimum value when the operating point (OP) is determined to be in a critical control region (A, B, C, F) of the control.

5. The method as claimed in claim 3, further comprising the step of:

regulating by the control algorithm the operating point (OP) to the desired value (OP_setpoint) of the operating point by steadily changing the control variable (c_var) when the operating point (OP) is determined to be in a defined safe region (E) of the control.

6. The method as claimed in claim 3, further comprising the step of:

recognizing with the control algorithm a disturbance, when the operating point (OP) is determined to be permanently in the disturbance region (D) above a maximum limit value of the difference frequency ($f_{Sweep}$), or below a minimum limit value of the difference time ($t_{Sweep}$).

7. The method as claimed in claim 1, further comprising the step of:

incrementing an error counter in the control algorithm in the case of a defined limit value of the control deviation of the difference frequency ($f_{Sweep}$) from the desired value ($f_{Sweep\_setpoint}$) of the difference frequency, or of the difference time ($t_{Sweep}$) from the desired value ($t_{Sweep\_setpoint}$) of the difference time, when this limit value is exceeded, or is decremented when this limit value is complied with.

8. The method as claimed in claim 7, further comprising the step of:

setting a maximum count value of the error counter, at which the error counter is cleared, the control algorithm is interrupted, and the operating point (OP) is transferred into the defined, safer control region (E) of the control characteristic curve, by setting the control variable ($c\_var$) back to a minimum value.

9. The method as claimed in claim 1, further comprising the step of:

effecting a pulse width-modulated control signal ($R_{pwm}$) by the control algorithm, to a first tolerance value of a large control deviation of the difference frequency ($f_{Sweep}$) from the desired value ($f_{Sweep\_setpoint}$) of the difference frequency, or of the difference time ($t_{Sweep}$) from the desired value ($t_{Sweep\_setpoint}$) of the difference time.

10. The method as claimed in claim 1, further comprising the step of:

effecting a pulse sequence-modulated control signal ($R_{toggle}$) by the control algorithm, to a second tolerance value of a medium control deviation of the difference frequency ($f_{Sweep}$) from the desired value ($f_{Sweep\_setpoint}$) of the difference frequency, or of the difference time ($t_{Sweep}$) from the desired value ($t_{Sweep\_setpoint}$) of the difference time.

11. The method as claimed in claim 1, wherein:

to a third tolerance value of a tendential control deviation of the difference frequency ($f_{Sweep}$) from the desired value ($f_{Sweep\_setpoint}$) of the difference frequency, or of the difference time ($t_{Sweep}$) from the desired value ($t_{Sweep\_setpoint}$) of the difference time, there is no immediate counter-control with the corresponding control variable ($c\_var$); rather, a tendency of the control deviation is determined, and a tendential control signal ($S_{Drift}$) is produced, which is joined to the pulse sequence-modulated control signal ($R_{Toggle}$), or to the pulse width-modulated control signal ($R_{PWM}$).

* * * * *